(12) United States Patent
Nitzken et al.

(10) Patent No.: US 12,705,549 B2
(45) Date of Patent: Aug. 11, 2026

(54) SYSTEM AND METHOD OF SEGMENTING DATA AND FORECASTING BY A COMBINATION OF MODELS TRAINED ON SEGMENTED DATA

(71) Applicant: DataRobot, Inc., Boston, MA (US)

(72) Inventors: Matt Nitzken, Boston, MA (US); David McGarry, Boston, MA (US); Roman Midianyi, Kyiv (UA); Anatolli Stehni, Kyiv (UA)

(73) Assignee: DataRobot, Inc., Boston, MA (US)

( * ) Notice: Subject to any disclaimer, the term of this patent is extended or adjusted under 35 U.S.C. 154(b) by 642 days.

(21) Appl. No.: 18/078,276

(22) Filed: Dec. 9, 2022

(65) Prior Publication Data

US 2023/0186174 A1 Jun. 15, 2023

Related U.S. Application Data

(60) Provisional application No. 63/288,465, filed on Dec. 10, 2021.

(51) Int. Cl.
*G06N 20/20* (2019.01)

(52) U.S. Cl.
CPC .................................... *G06N 20/20* (2019.01)

(58) Field of Classification Search
USPC .......................................................... 706/12
See application file for complete search history.

(56) References Cited

U.S. PATENT DOCUMENTS

2018/0300737 A1* 10/2018 Bledsoe ........... G06Q 10/06395
2020/0134441 A1* 4/2020 Suthar ..................... H04L 43/08
2021/0374864 A1* 12/2021 Kchouk ................. G06Q 40/06
2023/0093823 A1* 3/2023 Yao ....................... G06N 3/088
706/12

* cited by examiner

*Primary Examiner* — Muluemebet Gurmu
(74) *Attorney, Agent, or Firm* — Greenberg Traurig LLP; Andrew J. Tibbetts; Samuel S. Stone

(57) ABSTRACT

Segmenting data and forecasting by a combination of models trained on segmented data is provided. A system compares, with a first model, values of timestamps corresponding to data points to determine a time series dependency between the data points. The system generates, with the first model and based on the time series dependency, a first cluster with first data points and a second cluster with second data points. The system allocates, by a controller, a second model to the first cluster, and a third model to the second cluster. The system trains the second model based on the time series dependency and the first data points. The system trains the third model based on the time series dependency and the second data points. The system generates a fourth model based on a combination of the second trained model and the third trained model.

17 Claims, 11 Drawing Sheets

100A

Figure 2:
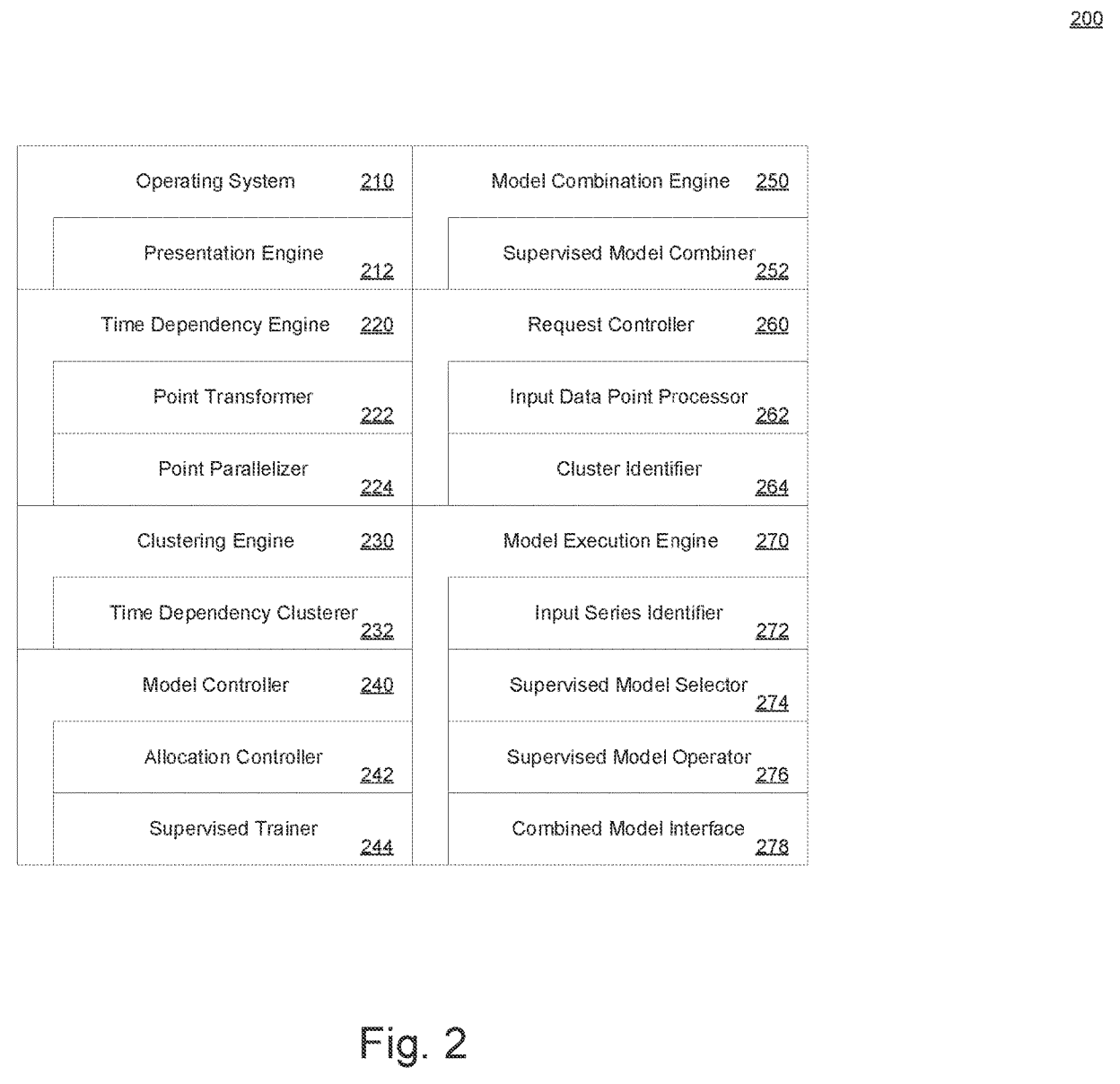

200

Operating System 210

Presentation Engine 212

Time Dependency Engine 220

Point Transformer 222

Point Parallelizer 224

Clustering Engine 230

Time Dependency Clusterer 232

Model Controller 240

Allocation Controller 242

Supervised Trainer 244

Model Combination Engine 250

Supervised Model Combiner 252

Request Controller 260

Input Data Point Processor 262

Cluster Identifier 264

Model Execution Engine 270

Input Series Identifier 272

Supervised Model Selector 274

Supervised Model Operator 276

Combined Model Interface 278

SYSTEM AND METHOD OF SEGMENTING DATA AND FORECASTING BY A COMBINATION OF MODELS TRAINED ON SEGMENTED DATA

CROSS-REFERENCE TO RELATED PATENT APPLICATIONS

This application claims the benefit of priority under 35 U.S.C. § 119 to U.S. Provisional Patent Application Ser. No. 63/288,465, entitled "SYSTEMS AND METHOD OF SEGMENTING DATA AND FORECASTING BY A COMBINATION OF MODELS TRAINED ON SEGMENTED DATA," filed Dec. 10, 2021, the contents of such application being hereby incorporated by reference in its entirety and for all purposes as if completely and fully set forth herein.

FIELD OF THE DISCLOSURE

This disclosure relates generally to generating machine learning models, and more particularly to segmenting data and forecasting by a combination of models trained on segmented data.

INTRODUCTION

Understanding future behavior of complex systems is increasingly important to maintain efficiency, desired output, and error-free operation of such complex systems. However, it can be challenging to determine behavior of such systems at an increased level of granularity in a reliable and efficient manner. Indeed, it can be difficult to efficiently and effectively distinguish between portions of input that may behave differently with respect to each other over time, which can significantly reduce efficiency of understanding future behavior, and reduces effectiveness of the system where sufficient resources are not available.

SUMMARY

Systems and methods of this technical solution can automatically identify and generate segments of an input data set in accordance with one or more clustering metrics, for example. The segments can correspond to groupings of subsets of input data, where each subset is grouped by one or more characteristics common to each subset. The characteristics can include, for example, similarities with respect to one or more features associated with each subset. Each subset can then be associated with a particular supervised learning model. The supervised learning model can be optimized to operate on the subsets, based on one or more characteristics of each of the subset. As one example, a supervised learning model optimized for input data having, for example, a particular percentage of zero or null values, may be associated with a subset having the corresponding particular percentage of zero or null values. Each supervised learning model can then be combined into a combined model capable of receiving input data corresponding to multiple subsets, and can generate output providing a forecast value automatically optimized for a particular subset. Thus, the combined model can generate forecasts for future values of particular targets, taking into account whether the target falls into a particular subset optimized according to a particular segmented model. The combined model can thus advantageously generate a forecast for at least one target at a higher level of granularity and with a higher predictive accuracy, by advantageously identifying a forecast value optimized to a particular subset of an input data set. Thus, a technological solution for segmenting data and forecasting by a combination of models trained on segmented data is provided.

A system can include a data processing system with memory and one or more processors to compare, with a first model, values of one or more timestamps corresponding to one or more data points to determine at least one time series dependency between one or more of the data points, generate, with the first model and based on the time series dependency, at least a first cluster and a second cluster each respectively including one or more first data points of the data points, and one or more second data points of the data points, allocate, by a controller, a second model to the first cluster, based on one or more first data points included in the first cluster, and a third model to the second cluster, based on one or more first data points included in the second cluster, train the second model based on the time series dependency and the one or more first data points, and train the third model based on the time series dependency and the one or more second data points, generate a fourth model based on a combination of the second trained model and the third trained model, and provide, in response to receiving an indication from a user by a user interface, a presentation based on the fourth model, the first data points, and the second data points.

In some arrangements of the system, the first model includes a clustering model.

In some arrangements of the system, the second model includes a first supervised model and the third model includes a second supervised model.

In some arrangements of the system, the first supervised model is configured to generate an output based on one or more characteristics of the first cluster.

In some arrangements of the system, the second supervised model is configured to generate an output based on one or more characteristics of the second cluster.

In some arrangements of the system, the data processing system can provide, to the fourth model, a request to generate a forecast value corresponding to one or more input data points having the time series dependency, and generate, based on input to at least one of the second model or the third model including one or more of the input data points, an output including a forecast based on the time series dependency.

In some arrangements of the system, the data processing system can determine, based on one or more of the input data points, that the input data points correspond to the second model, select the second model in response to the determination that the input data points correspond to the second model, and generate, based on input to the second model including one or more of the input data points, the output including the forecast based on the time series dependency.

In some arrangements of the system, the data processing system can determine, based on one or more of the input data points, that the input data points correspond to the third model, select the third model in response to the determination that the input data points correspond to the third model, and generate, based on input to the third model including one or more of the input data points, the output including the forecast based on the time series dependency.

In some arrangements of the system, the input data points correspond to a series having one or more values corresponding to at least one of the first cluster or the second cluster.

A method, including comparing, with a first model, values of one or more timestamps corresponding to one or more data points to determine at least one time series dependency between one or more of the data points, generating, with the first model and based on the time series dependency, at least a first cluster and a second cluster each respectively including one or more first data points of the data points, and one or more second data points of the data points, allocating, by a controller, a second model to the first cluster, based on one or more first data points included in the first cluster, and a third model to the second cluster, based on one or more first data points included in the second cluster, training the second model based on the time series dependency and the one or more first data points, and training the third model based on the time series dependency and the one or more second data points, generating a fourth model based on a combination of the second trained model and the third trained model, and providing, in response to receiving an indication from a user by a user interface, a presentation based on the fourth model, the first data points, and the second data points.

In some arrangements of the method, the first model includes a clustering model.

In some arrangements of the method, the second model includes a first supervised model and the third model includes a second supervised model.

In some arrangements of the method, the first supervised model is configured to generate an output based on one or more characteristics of the first cluster.

In some arrangements of the method, the second supervised model is configured to generate an output based on one or more characteristics of the second cluster.

In some arrangements, the method can include providing, to the fourth model, a request to generate a forecast value corresponding to one or more input data points having the time series dependency, and generating, based on input to at least one of the second model or the third model including one or more of the input data points, an output including a forecast based on the time series dependency.

In some arrangements, the method can include determining, based on one or more of the input data points, that the input data points correspond to the second model, selecting the second model in response to the determination that the input data points correspond to the second model, and generating, based on input to the second model including one or more of the input data points, the output including the forecast based on the time series dependency.

In some arrangements, the method can include determining, based on one or more of the input data points, that the input data points correspond to the third model, selecting the third model in response to the determination that the input data points correspond to the third model, and generating, based on input to the third model including one or more of the input data points, the output including the forecast based on the time series dependency.

In some arrangements of the method, the input data points correspond to a series having one or more values corresponding to at least one of the first cluster or the second cluster.

A computer readable medium can include one or more instructions stored thereon and executable by a processor to compare, by the processor and with a first model, values of one or more timestamps corresponding to one or more data points to determine at least one time series dependency between one or more of the data points, generate, by the processor and with the first model and based on the time series dependency, at least a first cluster and a second cluster each respectively including one or more first data points of the data points, and one or more second data points of the data points, allocate, by the processor, a second model to the first cluster, based on one or more first data points included in the first cluster, and a third model to the second cluster, based on one or more first data points included in the second cluster, train, by the processor, the second model based on the time series dependency and the one or more first data points, and train the third model based on the time series dependency and the one or more second data points, generate, by the processor, a fourth model based on a combination of the second trained model and the third trained model, and provide, by the processor, in response to receiving an indication from a user by a user interface, a presentation based on the fourth model, the first data points, and the second data points.

The computer readable medium where the computer readable medium further includes one or more instructions executable by the processor to provide, by the processor to the fourth model, a request to generate a forecast value corresponding to one or more input data points having the time series dependency, and generate, by the processor and based on input to at least one of the second model or the third model including one or more of the input data points, an output including a forecast based on the time series dependency.

BRIEF DESCRIPTION OF THE DRAWINGS

These and other aspects and features of this disclosure will become apparent to those ordinarily skilled in the art upon review of the following description of specific implementations in conjunction with the accompanying figures, wherein:

FIG. 2 illustrates a computing system further to the example system of FIG. 1A.

DETAILED DESCRIPTION

Figure 1A:
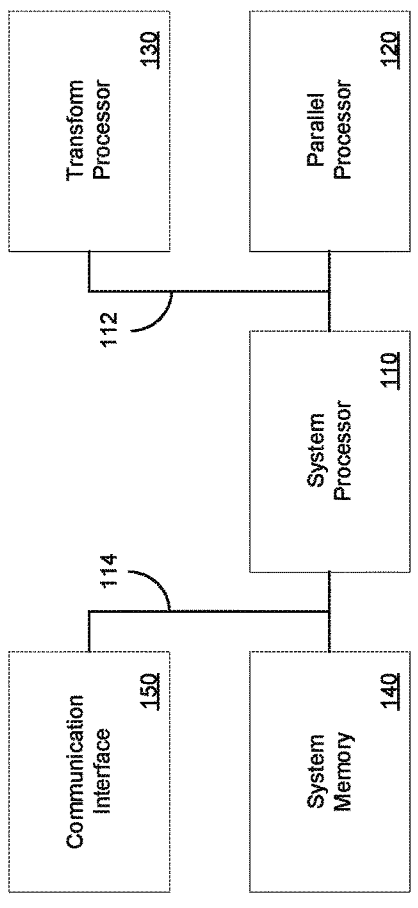
FIG. 1A illustrates a system in accordance with implementations.

The present implementations will now be described in detail with reference to the drawings, which are provided as illustrative examples of the implementations so as to enable those skilled in the art to practice the implementations and alternatives apparent to those skilled in the art. Notably, the figures and examples below are not meant to limit the scope of the present implementations to a single implementation, but other implementations are possible by way of interchange of some or all of the described or illustrated elements. Moreover, where certain elements of the present implementations can be partially or fully implemented using known components, only those portions of such known components that are necessary for an understanding of the present implementations will be described, and detailed descriptions of other portions of such known components will be omitted so as not to obscure the present implementations. Implementations described as being implemented in software should not be limited thereto, but can include implementations implemented in hardware, or combinations of software and hardware, and vice-versa, as will be apparent to those skilled in the art, unless otherwise specified herein. In the present specification, an implementation showing a singular component should not be considered limiting; rather, the present disclosure is intended to encompass other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present implementations encompass present and future known equivalents to the known components referred to herein by way of illustration.

Present implementations can advantageously apply a clustering model with one or more segmented models to generate an optimized model to at least generate forecast values at higher granularity and accuracy. A system can include multiple training processes each associated with distinct portions of an input data set, and can include a model execution that incorporates selection of a trained model among multiple trained models to generate forecast values at higher granularity and accuracy, based on a relationship between the forecast target and the selected trained model. A system can include a clustering model to segment an input data set based on one or more features having particular characteristics or similar characteristics to each other, for example. The characteristics can, for example, be associated with or include values of one or more features associated with an input data set and a training data set. The features can include columnar data structures and values of the features can include one or more cell values satisfying a particular feature column and a particular row corresponding to a particular data point. The data set as a whole can include one or more rows each corresponding to particular data points and one or more columns each corresponding to particular features.

Present implementations can advantageously automatically select and train one or more models corresponding to each segment. A system can, for example, automatically select a supervised machine learning model based on one or more characteristics of the data set, including content of the data set. For example, a system can identify a percentage, absolute number, or relative number of gaps in a data set. The gaps can include zero values, or null values, for example, that can be generated in response to a normalization of a data set with respect to a time metric. As one example, a time metric can include a time step associated with a data set. A time step can be a daily time step or an hourly time step, in which a data point appears associated with that time step. A normalization process can include normalizing a time step to associate each data point with a single time step having a particular granularity. Thus, a particular set of input data having a daily time step normalized to an hourly time step may include a significant number of gaps, because of the additional time steps added as hourly steps that do not appear in the original data set. A system can fill gaps in a data set with zeroes, null values, or values of the most recent past or future value appearing the data sets, for example.

The system can include or access multiple models each operable to generate a forecast model based on an input data set. The multiple models can include supervised machine learning models, and can each be optimized, for example, to generate accurate machine learning models from data sets having various characteristics including but not limited to particular numbers, percentages or the like, of gaps in a particular data set. The system can then select a model for each segment, based on the content, shape, or other characteristics of that model for the segment, for example. Each model can thus be assigned to a particular segment to which it is best optimized, to increase accuracy of forecasts generated by a combined model including, referencing, or integrating, for example, each of the multiple models. Each of the multiple models can then be combined into a combined model advantageously capable of automatically generating an output including a forecast value based on one of the models associated with a particular segment, based on a characteristic of the forecast requested. Thus, a system can advantageously obtain a request for generating a forecast at a particular time point along an axis defined by a time step, can identify a data segment of input data corresponding to the request, can identify a supervised learning model optimized for the particular data segment, and can generate a forecast optimized for the request based on the selected segmented model.

As one example, a combined model can forecast commercial demand for seasonal goods, including produce, at particular geographical locations. A system can receive input data including data points and features related to sales of avocados at various grocery stores across various states in the United States. Avocado sales can be associated with particular stores at particular locations, and can also be associated with a time step indicating avocado sales at particular times for each store. The time step can be a daily, weekly, or monthly time step, for example, and can describe the number of avocados sold at a particular store within a particular day, week, or month. Present implementations can receive the data set including data points for all stores, and can automatically cluster the data points into data sets based on one or more features of the data set.

Here, a system in accordance with present implementations can generate multiple clusters of the input data, with each cluster being associated with a group of stores in a particular climate. In this example, the system can generate a first cluster including stores with a warmer local climate with mild winters rarely below freezing, a second cluster including stores with a cooler local climate with cold winters consistently below freezing, and a third cluster including stores with a temperate climate with cool winters intermittently below freezing. The system can automatically cluster the data points into clusters having these attendant climate factors, without clustering based on predetermined climate-based metrics or other supervision. The data points for the first cluster can have the highest number or percentage of available data points, due to high availability of and interest in avocados during more of the year. The data points for the second cluster can have the lowest number or percentage of available data points, due to low availability of and interest in avocados during more of the year. The data points for the third cluster can have a number or percentage of available data points at a level between those for the first and second clusters, due to the availability of and interest in avocados seasonally over the year.

In this example, a system can receive a request from a user to generate a demand forecast for avocado sales at a particular store. Upon receiving the request, the system can identify the store can identify, based on one or more values, metrics or features associated with the store, a cluster associated with the store. The system can identify the store as associated with the first cluster, where the store is located in a warmer climate like that of California, Texas, or Florida. It is to be understood that present implementations can detect clustering features based on a number of factors, and are not limited to a simple geographic locational association based on a particular state. The system can then apply a model generated by a supervised learning model optimized for high-sales volume with few gaps, because that model is optimized for forecasting sales of avocados where demand remains relatively high and sales volumes are relatively high throughout the year. The supervised learning model can be trained with input including avocado sales data over time, with respect to stores in the first cluster. The system can then generate and present a forecast value for avocado sales at a particular time in the future, based on the model optimized for high-sales volume with few gaps. Thus, the system can more accurately forecast demand for avocados at a particular store based on input directed particularly to a cluster of stores with like climate and like behavior with respect to demand over time.

FIG. 1A illustrates a system in accordance with present implementations. As illustrated by way of example in FIG. 1A, an example processing system 100A includes a system processor 110, a parallel processor 120, a transform processor 130, a system memory 140, and a communication interface 150. In some implementations, at least one of the example processing system 100A or the system processor 110 includes a processor bus 112 and a system bus 114.

The system processor 110 can execute one or more instructions. The instructions can be associated with at least one of the system memory 140 or the communication interface 150. The system processor 110 can include an electronic processor, an integrated circuit, or the like including one or more of digital logic, analog logic, digital sensors, analog sensors, communication buses, volatile memory, nonvolatile memory, and the like. The system processor 110 can include but is not limited to, at least one microcontroller unit (MCU), microprocessor unit (MPU), central processing unit (CPU), graphics processing unit (GPU), physics processing unit (PPU), embedded controller (EC), or the like. In some implementations, the system processor 110 can include a memory operable to store or storing one or more instructions for operating components of the system processor 110 and operating components operably coupled to the system processor 110. The one or more instructions can include at least one of firmware, software, hardware, operating systems, embedded operating systems, or the like.

The processor bus 112 can communicate one or more instructions, signals, conditions, states, or the like between one or more of the system processor 110, the parallel processor 120, and the transform processor 130. The processor bus 112 can include one or more digital, analog, or like communication channels, lines, traces, or the like. It is to be understood that any electrical, electronic, or like devices, or components associated with the system bus 114 can also be associated with, integrated with, integrable with, supplemented by, complemented by, or the like, the system processor 110 or any component thereof.

The system bus 114 can communicate one or more instructions, signals, conditions, states, or the like between one or more of the system processor 110, the system memory 140, and the communication interface 150. The system bus 114 can include one or more digital, analog, or like communication channels, lines, traces, or the like. It is to be understood that any electrical, electronic, or like devices, or components associated with the system bus 114 can also be associated with, integrated with, integrable with, supplemented by, complemented by, or the like, the system processor 110 or any component thereof.

The parallel processor 120 can execute one or more instructions concurrently, simultaneously, or the like. The parallel processor 120 can execute one or more instructions in a parallelized order in accordance with one or more parallelized instruction parameters. Parallelized instruction parameters can include one or more sets, groups, ranges, types, or the like, associated with various instructions. The parallel processor 120 can include one or more execution cores variously associated with various instructions. The parallel processor 120 can include one or more execution cores variously associated with various instruction types or the like. The parallel processor 120 can include an electronic processor, an integrated circuit, or the like including one or more of digital logic, analog logic, communication buses, volatile memory, nonvolatile memory, and the like. The parallel processor 120 can include but is not limited to, at least one graphics processing unit (GPU), physics processing unit (PPU), embedded controller (EC), gate array, programmable gate array (PGA), field-programmable gate array (FPGA), application-specific integrated circuit (ASIC), or the like. It is to be understood that any electrical, electronic, or like devices, or components associated with the parallel processor 120 can also be associated with, integrated with, integrable with, supplemented by, complemented by, or the like, the system processor 110 or any component thereof.

Various cores of the parallel processor 120 can be associated with one or more parallelizable operations in accordance with one or more metrics, engines, models, and the like, of the example computing system of FIG. 3. As one example, parallelizable operations include processing portions of an image, video, waveform, audio waveform, processor thread, one or more layers of a learning model, one or more metrics of a learning model, one or more models of a learning system, and the like. A predetermined number or predetermined set of one or more particular cores of the parallel processor 120 can be associated exclusively with one or more distinct sets of corresponding metrics, engines, models, and the like, of the example computing system of FIG. 2. As one example, a first core of the parallel processor 120 can be assigned to, associated with, configured to, fabricated to, or the like, execute one engine of the computing system of FIG. 2. In this example, a second core of the parallel processor 120 can also be assigned to, associated with, configured to, fabricated to, or the like, execute another engine of the computing system of FIG. 2. Thus, the parallel processor 120 can parallelize execution across one or more metrics, engines, models, and the like, of the computing system of FIG. 2. Similarly, a predetermined number or predetermined set of one or more particular cores of the parallel processor 120 can be associated collectively with corresponding metrics, engines, models, and the like, of the computing system of FIG. 2. As one example, a first plurality of cores of the parallel processor can be assigned to, associated with, configured to, fabricated to, or the like, execute one engine of the computing system of FIG. 2. In this example, a second plurality of cores of the parallel processor can also be assigned to, associated with, configured to, fabricated to, or the like, execute another engine of the computing system of FIG. 2. Thus, the parallel processor 120 can parallelize execution within one or more metrics, engines, models, and the like, of the computing system of FIG. 2.

The transform processor 130 can execute one or more instructions associated with one or more predetermined transformation processes. As one example, transformation processes include Fourier transforms, matrix operations, calculus operations, combinatoric operations, trigonometric operations, geometric operations, encoding operations, decoding operations, compression operations, decompression operations, image processing operations, audio processing operations, and the like. The transform processor 130 can execute one or more transformation processes in accordance with one or more transformation instruction parameters. Transformation instruction parameters can include one or more instructions associating the transform processor 130 with one or more predetermined transformation processes. The transform processor 130 can include one or more transformation processes. The transform processor 130 can include a plurality of transform processors 130 variously associated with various predetermined transformation processes. The transform processor 130 can include a plurality of transformation processing cores each associated with, configured to execute, fabricated to execute, or the like, a predetermined transformation process. The transform processor 130 can include an electronic processor, an integrated circuit, or the like including one or more of digital logic, analog logic, communication buses, volatile memory, non-volatile memory, and the like. The transform processor 130 can include but is not limited to, at least one graphics processing unit (GPU), physics processing unit (PPU), embedded controller (EC), gate array, programmable gate array (PGA), field-programmable gate array (FPGA), application-specific integrated circuit (ASIC), or the like. It is to be understood that any electrical, electronic, or like devices, or components associated with the transform processor 130 can also be associated with, integrated with, integrable with, supplemented by, complemented by, or the like, the system processor 110 or any component thereof.

The transform processor 130 can be associated with one or more predetermined transform processes in accordance with one or more metrics, engines, models, and the like, of the computing system of FIG. 2. A predetermined transform process of the transform processor 130 can be associated with one or more corresponding metrics, engines, models, and the like, of the computing system of FIG. 2. As one example, the transform processor 130 can be assigned to, associated with, configured to, fabricated to, or the like, execute one matrix operation associated with one or more engines, metrics, models, or the like, of the computing system of FIG. 2. As another example, the transform processor 130 can alternatively be assigned to, associated with, configured to, fabricated to, or the like, execute another matrix operation associated with one or more engines, metrics, models, or the like, of the example computing system of FIG. 2. Thus, the transform processor 130 can centralize, optimize, coordinate, or the like, execution of a transform process across one or more metrics, engines, models, and the like, of the example computing system of FIG. 2. In some implementations, the transform processor is fabricated to, configured to, or the like, execute a particular transform process with at least one of a minimum physical logic footprint, logic complexity, heat expenditure, heat generation, power consumption, or the like, with respect to one or more metrics, engines, models, and the like, of the example computing system of FIG. 2.

The system memory 140 can store data associated with the example processing system 100. The system memory 140 can include one or more hardware memory devices for storing binary data, digital data, or the like. The system memory 140 include one or more electrical components, electronic components, programmable electronic components, reprogrammable electronic components, integrated circuits, semiconductor devices, flip flops, arithmetic units, or the like. The system memory 140 can include at least one of a non-volatile memory device, a solid-state memory device, a flash memory device, or a NAND memory device. The system memory 140 can include one or more addressable memory regions disposed on one or more physical memory arrays. As one example, a physical memory array can include a NAND gate array disposed on a particular semiconductor device, integrated circuit device, or printed circuit board device.

The communication interface 150 can communicatively couple the system processor 110 to an external device. An external device includes but is not limited to a smartphone, mobile device, wearable mobile device, tablet computer, desktop computer, laptop computer, cloud server, local server, and the like. The communication interface 150 can communicate one or more instructions, signals, conditions, states, or the like between one or more of the system processor 110 and the external device. The communication interface 150 includes one or more digital, analog, or like communication channels, lines, traces, or the like. As one example, the communication interface 150 can include at least one serial or parallel communication line among multiple communication lines of a communication interface. The communication interface 150 can include one or more wireless communication devices, systems, protocols, interfaces, or the like. The communication interface 150 can include one or more logical or electronic devices including but not limited to integrated circuits, logic gates, flip flops, gate arrays, programmable gate arrays, and the like. The communication interface 150 can include one or more telecommunication devices including but not limited to antennas, transceivers, packetizers, wired interface ports, and the like. It is to be understood that any electrical, electronic, or like devices, or components associated with the communication interface 150 can also be associated with, integrated with, integrable with, replaced by, supplemented by, complemented by, or the like, the system processor 110 or any component thereof.

Figure 1B:
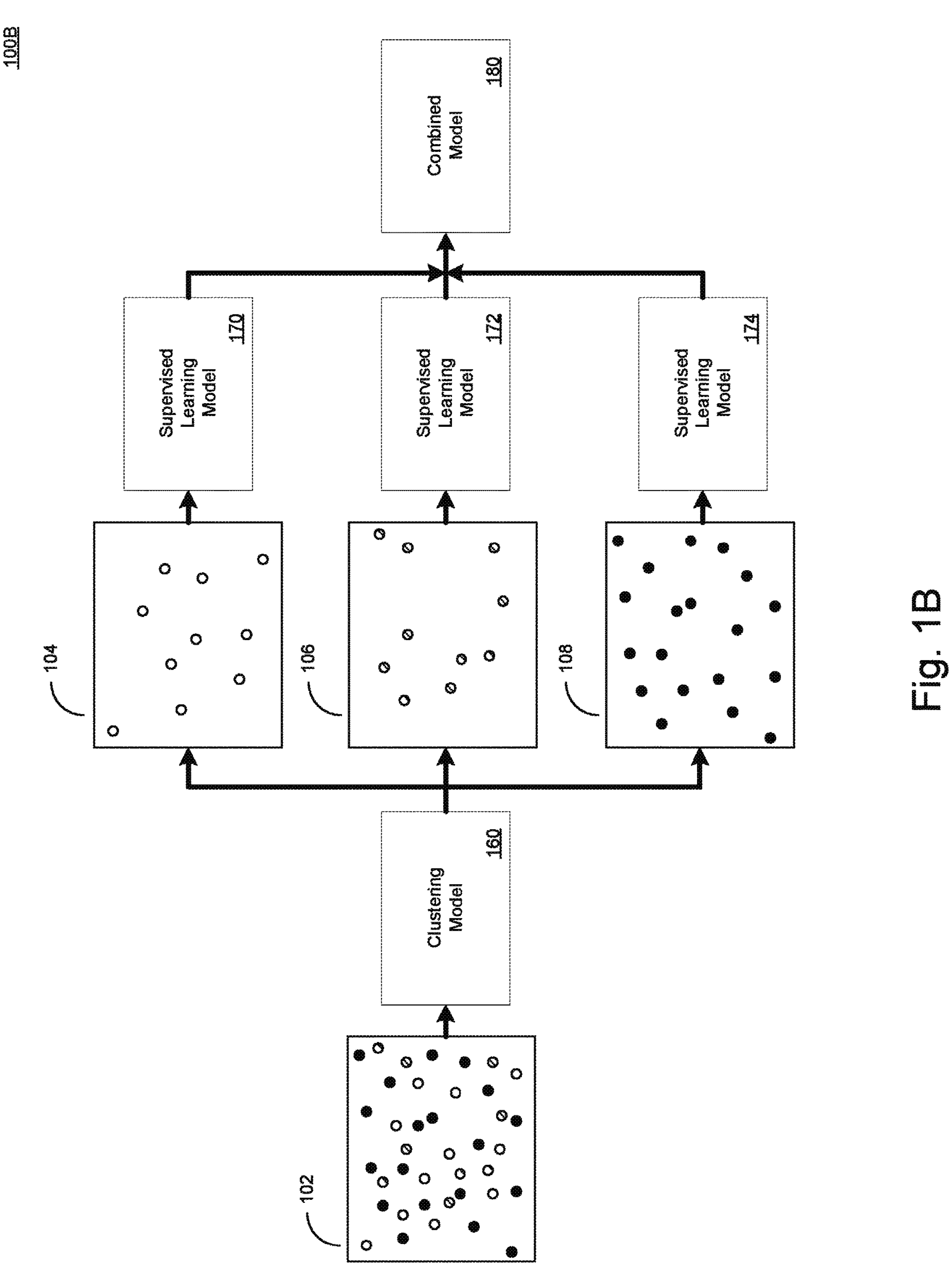
FIG. 1B illustrates a system architecture in accordance with implementations.

FIG. 1B illustrates a system architecture in accordance with present implementations. As illustrated by way of example in FIG. 1B, an example system architecture 100B can include an unclustered input data set 102, a clustering model 160, a plurality of clustered data sets 104, 106 and 108, a plurality of supervised learning models 170, 172 and 174, and a combined model 180. The clustering model 160 can generate the clustered data sets 104, 106 and 108 from the unclustered input data set 102. It is to be understood that the clustering model is not limited to generating the particular number of clustering models illustrated herein by way of example. It is to be further understood that the clustered data sets 104, 106 and 108 are not limited to a one-to-one correspondence with any particular supervised learning model.

An example system architecture can compare, with the clustering model 160, values of one or more timestamps corresponding to one or more data points of the unclustered input data set 102, to determine at least one time series dependency between one or more of the data points;

generate, with the clustering model 160 and based on the time series dependency, at least the clustered data sets 104, 106 and 108 each respectively including subsets of the data points of the unclustered input data set 102, allocate, by a controller, the supervised learning models 170, 172 and 174 respectively to the clustered data sets 104, 106 and 108, based on a subset of data points for each of the clustered data sets 104, 106 and 108, train the second model based on the time series dependency and the one or more first data points, and train the supervised learning models 170, 172 and 174 respectively based on the time series dependency and the clustered data sets 104, 106 and 108, generate the combined model 180 based on a combination of the supervised learning models 170, 172 and 174, and provide, in response to receiving an indication from a user by a user interface, a presentation based on the combined model 180, and the clustered data sets 104, 106 and 108.

FIG. 2 illustrates a computing system further to the example system of FIG. 1A. As illustrated by way of example in FIG. 2, an example computing system 200 can include an operating system 210, a time dependency engine 220, a clustering engine 230, a model controller 240, a model combination engine 250, a request controller 260, and a mode execution engine 270. The computing system can, for example, comprise one or more instructions or hardware elements stored on or integrated with the system memory 140.

The operating system 210 can include hardware control instructions and program execution instructions. The operating system 210 can include a high level operating system, a server operating system, an embedded operating system, or a boot loader. The operating system 210 can include one or more instructions operable specifically with or only with the system processor 110, the parallel processor 120, or the transform processor 130. The operating system 210 can include a presentation engine 212. The presentation engine 212 can include one or more instructions to instruct a display device to present one or more graphical user interface elements. Graphical user interface elements can include, but are not limited to text, images, video charts, graphs, tables, two-dimensional models, and three-dimensional models. The display device can include an electronic display. An electronic display can include, for example, a liquid crystal display (LCD), a light-emitting diode (LED) display, an organic light-emitting diode (OLED) display, or the like.

The time dependency engine 220 can generate at least one of a time dependency relationship between one or more input data points having a time parameter. As one example, a time parameter can include a timestamp or datestamp associated with a particular data point. The time dependency engine 220 can generate a time dependency relationship based on point-in-time clustering as discussed herein. The time dependency engine 220 can generate a time dependency relationship based on dominant-over-time clustering as discussed herein. It is to be understood that present implementations are not, however, limited to point-in-time or dominant-over time examples as discussed herein. The time dependency engine 220 can include a point transformer 222 and a point parallelizer 224.

The point transformer 222 can include processor-specific instructions to execute at least a portion of the time dependency engine 220 by the transform processor 130. As one example, the point transformer 222 can include a subset of instructions of the time dependency engine 220 optimized for execution by the transform processor 130. The point parallelizer 224 can include processor-specific instructions to execute at least a portion of the time dependency engine 220 by the parallel processor 120. As one example, the point parallelizer 224 can include a subset of instructions of the time dependency engine 220 optimized for execution by the parallel processor 120. The subset of instructions can include at least a portion of instructions associated with at least one of point-in-time clustering or dominant-over-time clustering.

The clustering engine 230 can generate one or more clusters from input data points. The clusters can themselves include multiple data points, at least as illustrated by way of example in FIGS. 3A-B. The clustering engine 230 can include a time dependency clusterer 232. The time dependency clusterer 232 can generate one or more clusters from input data points, where the data points are associated with a time dependency. The time dependency can correspond to a time dependency based on timestamps or datestamps, for example, generated by the time dependency engine 220. The clustering engine 230 can include, reference, or be associated with, for example, one or more clustering models capable of clustering in accordance with a time dependency. It is to be understood that the time dependency engine 220 and the clustering engine 230 can together advantageously generate clusters from data points having a time dependency with reduced or eliminated reduction in forecast accuracy, as compared to clustering models lacking explicit time dependency capability.

The model controller 240 can associated one or more particular models with one or more particular clusters. As one example, the model controller can associate particular clusters with particular corresponding supervised learning models, in accordance with FIG. 4. The model controller 240 can include an allocation controller 242 and a supervised trainer 244. The allocation controller 242 can allocate a supervised learning model to a particular cluster. The allocation controller 242 can identify characteristics of one or more particular input data points, and can determine a particular model best suited to receive the input data points as training input. As one example, the allocation controller 242 can identify that a particular set of data points in a particular cluster has a higher number of zero or null values, and can identify a supervised learning model optimized for input data with a corresponding high number of zero or null values.

The supervised trainer 244 can train one or more selected models based on one or more corresponding input data points. As one example, the supervised trainer 244 can train a first supervised model optimized for a high number of zero or null values based on input data having a corresponding high number of zero or null values, as discussed above. As another example, the supervised trainer 244 can train a second supervised model optimized for a low number of zero or null values based on input data having a corresponding low number of zero or null values, in a distinct cluster. The supervised trainer 244 can include processor-specific instructions to execute at least a portion of the supervised trainer 244 by the parallel processor 120. As one example, the supervised trainer 244 can be optimized to execute training for separate models in parallel by the parallel processor 120. The supervised trainer 244 can include processor-specific instructions to execute at least a portion of the supervised trainer 244 by the transform processor 130. As one example, the supervised trainer 244 can be optimized to execute training for particular training operations, including matrix operations, by the transform processor 130 optimized to efficiently execute those instructions.

The model combination engine 250 can combine one or more models associated with particular clusters into a combined model capable of providing forecast output optimized for each cluster, and capable of providing output for all clusters. The model combination engine 250 can include a supervised model combiner 252. The supervised model combiner 252 can combine one or more models associated with particular clusters into a combined model capable of providing forecast output optimized for each cluster.

The request controller 260 can obtain and execute one or more requests to execute the combined model with respect to a particular input data set or forecast target. The forecast target can include a particular value of a particular feature at a particular time, and the request can include an identification of one of the above values to be generated and output by the combined model. The request controller 260 can include an input data point processor 262 and a cluster identifier 264. The input data point processor 262 can obtain one or more inputs data points, and can provide the input data points to the cluster identifier 264. The cluster identifier 264 can identify a particular cluster having one or more characteristics corresponding to the input data points. As one example, the cluster identifier 264 can determine that a particular set of input data points is associated with a particular cluster generated by the clustering engine 230.

The model execution engine 270 can generate an output in accordance with a request obtained at the request controller 260. The model execution engine 270 can include an input series identifier 272, a supervised model selector 274, a supervised model operator 276, and a combined model interface 278. The input series identifier 272 can determine an input series associated with a particular set of input data points, based on the cluster identified by the cluster identifier 264. As one example, the cluster identifier 264 can determine that a set of input data points corresponds to a particular cluster, and the input series identifier 272 can determine that the particular cluster corresponds to a particular series. A particular series can include, for example, a series associated with a particular characteristic. The characteristic can include, for example, a series identifying a warm, temperate, or cool climate. The supervised model selector 274 can select a model optimized for the input data points. As one example, the supervised model selector 274 can select a supervised learning model optimized for the cluster identified for the input data points. As another example, the supervised model selector 274 can select a supervised learning model optimized for the series identified for the input data points.

The supervised model operator 276 can execute a particular optimized model associated with the combined model, based on the cluster or series associated with the input data points. As one example, the supervised model operator 276 can execute a forecast model optimized for stores in a temperate climate, where the input series identifier 272 identifies the temperate series as associated with the input data points. The combined model interface 278 can obtain output from an optimized model of the combined model and can provide the output as the output of the combined model. Thus, the combined model interface 278 can provide a unified interface for the combined model regardless of the underlying model selected to operate on the input data points.

Figure 3A:
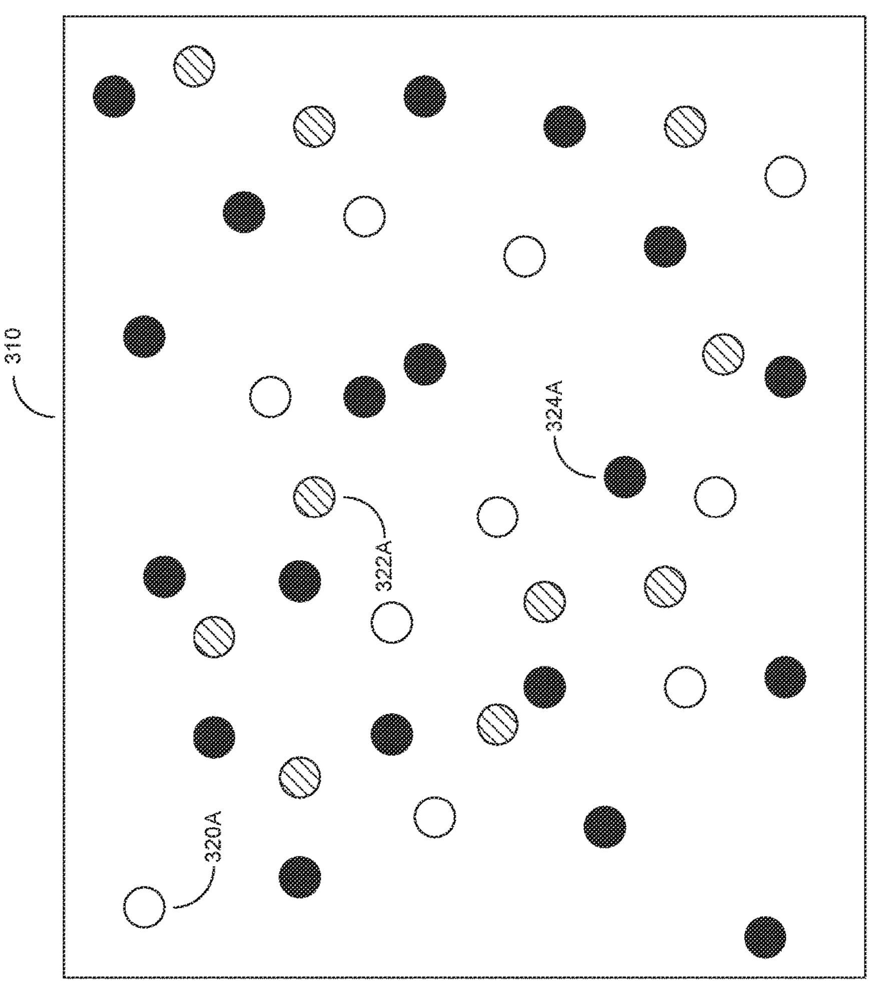
FIG. 3A illustrates a first state of a data set in accordance with implementations.

FIG. 3A illustrates a first state of a data set in accordance with present implementations. As illustrated by way of example in FIG. 3A, an example data set in a first state 300A can include a data cluster 310 including a first set of data points 320A, a second set of data points 322A, and a third set of data points 324A.

The data cluster 310 can include one or more data points and one or more sets of data points. The data cluster can 310 include an object based on, or generated from, one or more databases, records, tabular data structures, and the like. As one example, one or more of the systems 100A, 100B and 200 can generate the data cluster 310. Data points can be associated wither the data cluster 310 by one or more of a value indicating an association, and a default association. As one example, the data cluster 310 can be a default cluster into which all input data points from a data set are associated with default. As another example, the data cluster 310 can include at least one feature or column corresponding to an assignment of a data point to a particular cluster. Thus, in this example, the data cluster 310 can include a single column value in each cell or index of a cluster assignment column, to indicate that all rows for each of the data points in the input data set are associated with the data cluster 310. It is to be understood that the data points of the data cluster can have an arbitrary number of dimensions, features, and characteristics.

The first, second and third sets of data points 320A, 322A and 324A can each be associated with particular respective series of data. Present implementations can advantageously identify these series based on one or more features and characteristics, for example, of the data points with respect to each other, in accordance with the operation of systems 100A, 100B, and 200. In particular, present implementations can identify the first, second and third sets of data points 320A, 322A and 324A from an unclustered group of data points or a group of data points collected into a default cluster. Thus, a manual intervention can advantageously be avoided and the systems 100A, 100B and 200 can generate clusters including sets of data points having particular common characteristics. It is to be understood that each of the first, second and third sets of data points 320A, 322A and 324A can correspond to points having one or more common characteristics. As one example, the first set of data points 320A can correspond to stores in a warmer climate, the second set of data points 322A can correspond to stores in a temperate climate, and the third set of data points 324A can correspond to stores in a colder climate.

Present implementations can provide multiple advantages with respect to clustering, including enabling automated clustering of data sets dependent on a time dimension. For example, data points can have meaning based on values of their corresponding timestamps, and can correspond to time-series data structures and data sets. Time series can include multi-dimensional modeling and clustering. Individual target data can be optimized to predict over time across multiple distinct series. Further, time-series models can include known-in-advance and not-known-in-advance features variously associated with each of those time points. Clustering in accordance with present implementations can reduce and eliminate clustering of a very large number of features, across time and across multiple distinct entities. This can advantageously avoid generating confusing and potentially meaningless clusters, when time-series dependencies of the input data sets and data points are not modeled distinctly from features without time dependency.

Figure 3B:
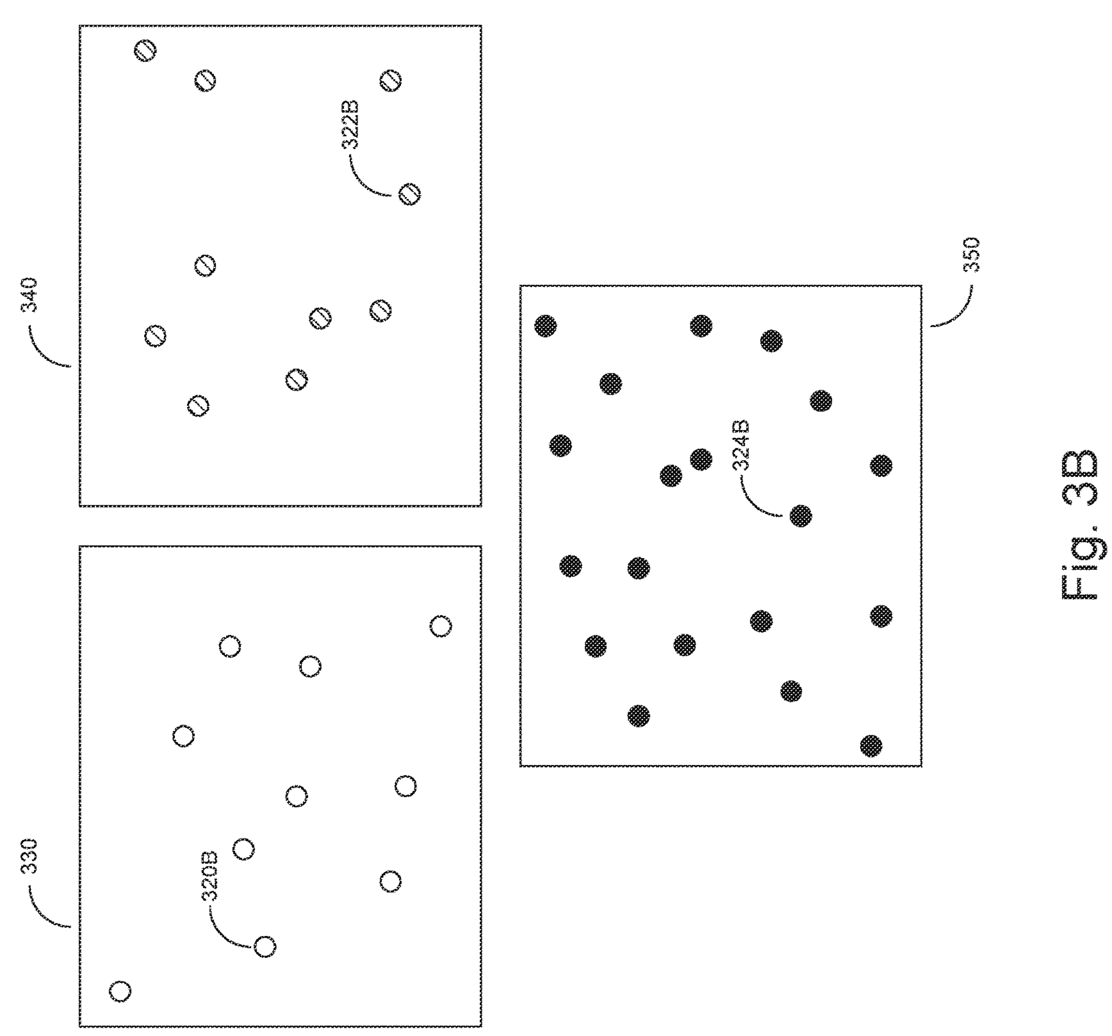
FIG. 3B illustrates a segmented state of a data set further to the data set of FIG. 3A.

FIG. 3B illustrates a segmented state of a data set further to the data set of FIG. 3A. As illustrated by way of example in FIG. 3B, an example data set in a segmented state 300B can include a first cluster 330 including a first set of data points 320B segmented from the data cluster 310, a second cluster 340 including a second set of data points 322B segmented from the data cluster 310, and a third cluster 330 including a third set of data points 324B segmented from the data cluster 310. The first, second and third sets of data points 320B, 322B and 324B can respectively correspond to the first, second and third sets of data points 320A, 322A and 324A.

Thus, present implementations can generate clusters relevant for users. First a system can obtain columns of importance from a user, by for example, a user interface selection. This can indicate which features are to be used in feature generation and clustering to limit the number of clustering dimensions. Second, the system can limit feature generation to reduce the complexity and quantity of derived features for clustering models. Third, the system can cluster based on one or more time-dependent clustering techniques. Time-dependent clustering techniques can, for example, include at least one of point-in-time or dominant-over-time clustering selection.

Point-in-time clustering can generate all features over time, and reduce these features into series specific vectors. Each series can be associated with a single vector containing many different features that are calculated as either averages, minima, or maxima, for example, of the values of the feature over the lifetime of its existence. Clusters can then be determined by associating the features within these series vectors. A dominant-over-time clustering can generate features over time, can quickly construct many instances of a clustering model, and can determines series associations based on the most dominant observed clusters. For predictions, dominant-over-time clustering can be trained using a point-in-time style approach applied against a subset of features including w the most dominant features of the data.

Figure 4:
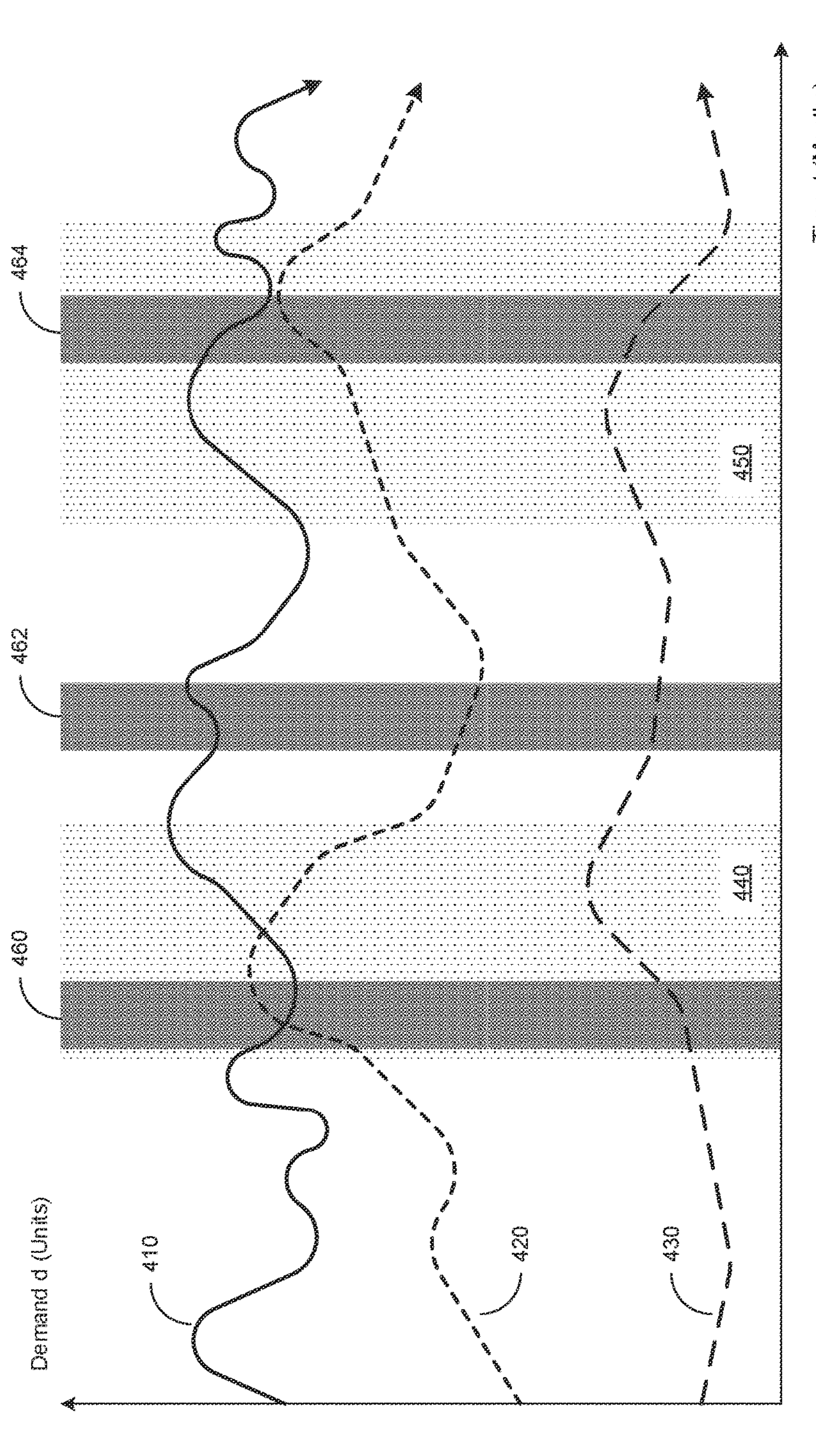
FIG. 4 illustrates a forecast model including demand over time for a segmented data set, in accordance with implementations.

FIG. 4 illustrates a forecast model including demand over time for a segmented data set, in accordance with present implementations. As illustrated by way of example in FIG. 4, an example model 400 can include a first forecast curve 410, a second forecast curve 420, a third forecast curve 430, a first trend window 440, a second trend window 450, a first activity window 460, a second activity window 462, and a third activity window 464.

The first forecast curve 410 can correspond to a time-series forecast based on the first set of data points 320B in the first cluster 330. The first forecast curve 410 can, for example, indicate demand in the future for a particular series identified by clustering of the first set of data points 320B, in accordance with a time-dependent clustering operation. At least one of the systems 100A, 100B, or 200 can generate the first forecast curve 410 based on a supervised model optimized for the first set of data points 320B. As one example, the first forecast curve 410 can correspond to a prediction of future sales over a period of months. In this example, sales can indicate a demand in units for avocados at stores located in a warmer climate.

The second forecast curve 420 can correspond to a time-series forecast based on the second set of data points 322B in the second cluster 340. The second forecast curve 420 can, for example, indicate demand in the future for a particular series identified by clustering of the second set of data points 322B, in accordance with a time-dependent clustering operation. At least one of the system 100A, 100B or 200 can generate the second forecast curve 420 based on a supervised model optimized for the second set of data points 322B. As one example, the second forecast curve 420 can correspond to a prediction of future sales over a period of months. In this example, sales can indicate a demand in units for avocados at stores located in a temperate climate.

The third forecast curve 430 can correspond to a time-series forecast based on the third set of data points 324B in the third cluster 350. The third forecast curve 430 can, for example, indicate demand in the future for a particular series identified by clustering of the third set of data points 324B, in accordance with a time-dependent clustering operation. At least one of the system 100A, 100B, or 200 can generate the third forecast curve 430 based on a supervised model optimized for the third set of data points 324B. As one example, the third forecast curve 430 can correspond to a prediction of future sales over a period of months. In this example, sales can indicate a demand in units for avocados at stores located in a cooler climate.

The first and second trend windows 440 and 450 can each respectively indicate period of time where overall forecasts between multiple series are at least partially correlated in the aggregate. The first trend window 440 can indicate a first time period during which one or more of the forecast curves 410, 420 and 430 exhibit correlated behavior. Here, the first trend window 440 can indicate a first seasonal increase in demand over a particular subset of time that can be defined in months or portions thereof. As one example, the first trend window 440 can indicate an increase in demand, during a spring season, in avocado sales across stores in one or more of warmer, temperate, and cooler climates. The second trend window 450 can indicate a second time period during which one or more of the forecast curves 410, 420 and 430 exhibit correlated behavior. Here, the second trend window 450 can indicate a second seasonal increase in demand over a particular subset of time that can be defined in months or portions thereof. As one example, the second trend window 450 can indicate an increase in demand, during an autumn season, in avocado sales across stores in one or more of warmer, temperate, and cooler climates.

The first activity window 460 can indicate a first time period during which a least one forecast curve among the forecast curves 410, 420 and 430 exhibits behavior not correlated with one or more of the forecast curves. Here, the first activity window 460 can indicate a first period within the first seasonal increase in demand, during which the forecast curve 420 and 430 generally indicate increasing demand, while the forecast curve 410 concurrently indicates decreasing demand. As one example, the first activity window 460 can indicate a dip in demand within a spring season, in avocado sales for stores in a warmer climate, while indicating increasing demand concurrently for stores in temperate and cooler climates.

The second activity window 462 can indicate a second time period during which a least one forecast curve among the forecast curves 410, 420 and 430 exhibits behavior not correlated with one or more of the forecast curves. Here, the second activity window 462 can indicate a second period independent of any seasonal indication, during which the forecast curve 420 and 430 generally indicate decreasing demand, while the forecast curve 410 concurrently indicates increasing demand. As one example, the second activity window 462 can indicate an increase in demand outside any indicated season, in avocado sales for stores in a warmer climate, while indicating a dip in demand concurrently for stores in temperate and cooler climates.

The third activity window 464 can indicate a third time period during which a least one forecast curve among the forecast curves 410, 420 and 430 exhibits behavior not correlated with one or more of the forecast curves. Here, the third activity window 464 can indicate a third period within the second seasonal increase in demand, during which the forecast curve 410 and 430 generally indicate decreasing demand, while the forecast curve 420 concurrently indicates increasing demand. As one example, the third activity window 464 can indicate a dip in demand within a spring season, in avocado sales for stores in a warmer climate and store in a cooler climate, while indicating increasing demand concurrently for stores in a temperate climate. Thus, the first activity window 460, second activity window 462, and third activity window 464 can indicate that the system 100A, 100B or 200 can identify forecast behavior for segmented clusters of an input data set at an advantageously higher granularity achieved by present implementations, including behavior identified by the system that may appear counter-intuitive to experts and thus not reasonably within the capacity of a manual intervention to successfully identify. The first, second, and third activity windows 460, 462 and 464 indicate a granularity in forecast power advantageously beyond the capability of a manual intervention or by expert-driven manual process.

Figure 5A:
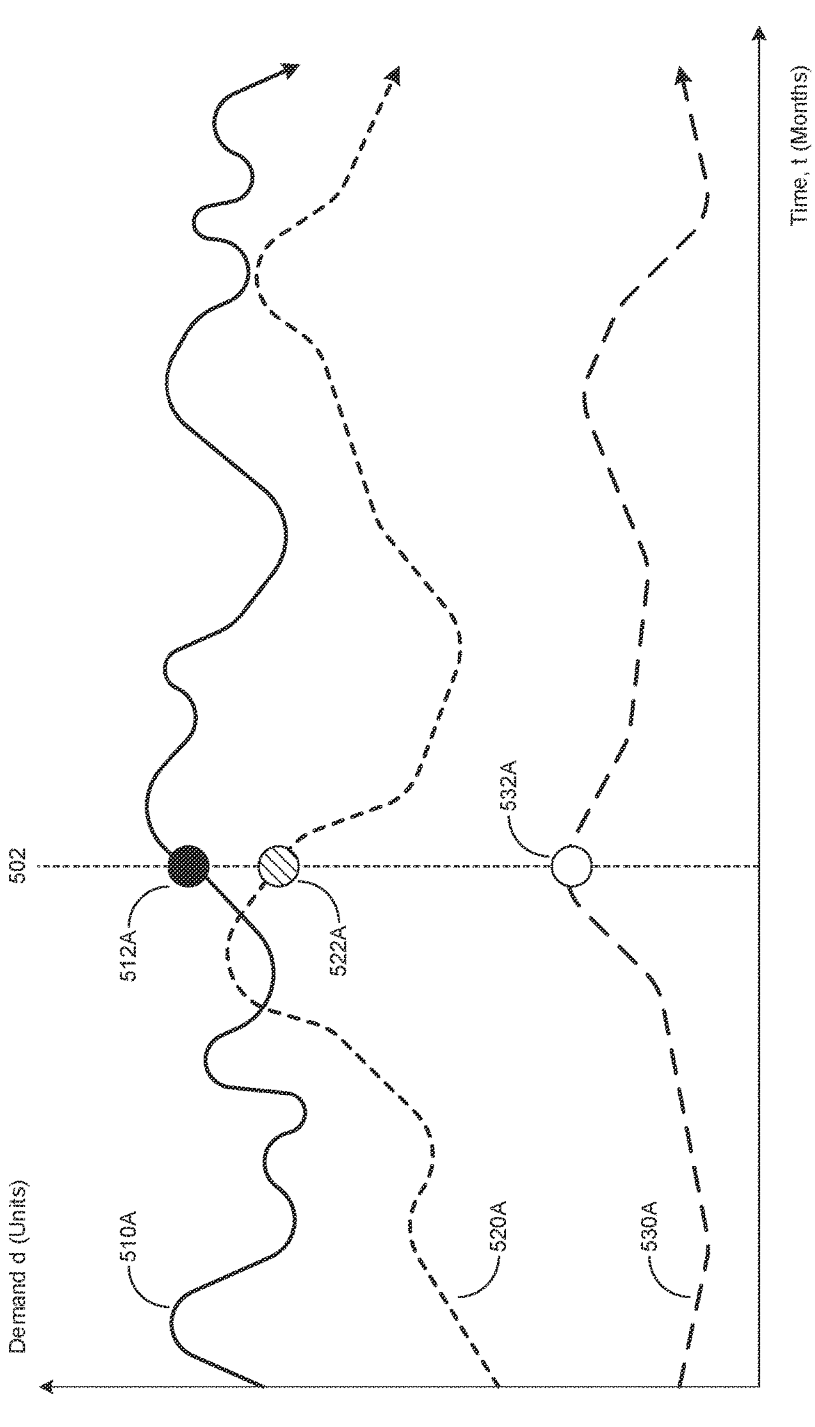
FIG. 5A illustrates a first state of a forecast model for a segmented data set, in accordance with implementations.

FIG. 5A illustrates a first state of a forecast model for a segmented data set, in accordance with present implementations. As illustrated by way of example in FIG. 5A, an example model 500A can include a first forecast curve 510A, a second forecast curve 520A, and a third forecast curve 530A.

The first forecast curve 510A can at least partially correspond to the first forecast curve 410, and can include a forecast point 512A having a particular forecast value and having a timestamp corresponding to a forecast time 502. The first forecast point 512A can indicate a forecast value associated with a first cluster. The first cluster can be generated by a first supervised machine learning system selected by the system 100A, 100B or 200 to be optimized for modeling based on the content of the first cluster. As one example, the forecast point 512A can indicate a future demand for avocados during a particular week corresponding to the forecast time 502, at stores in a warmer climate.

The second forecast curve 520A can at least partially correspond to the second forecast curve 420, and can include a forecast point 522A having a particular forecast value and having a timestamp corresponding to a forecast time 502. The second forecast point 522A can indicate a forecast value associated with a second cluster. The second cluster can be generated by a second supervised machine learning system selected by the system 100A, 100B or 200 to be optimized for modeling based on the content of the second cluster. As one example, the forecast point 522A can indicate a future demand for avocados during a particular week corresponding to the forecast time 502, at stores in a temperate climate.

The third forecast curve 530A can at least partially correspond to the third forecast curve 430, and can include a forecast point 532A having a particular forecast value and having a timestamp corresponding to a forecast time 502. The third forecast point 532A can indicate a forecast value associated with a third cluster. The third cluster can be generated by a third supervised machine learning system selected by the system 100A, 100B or 200 to be optimized for modeling based on the content of the third cluster. As one example, the forecast point 532A can indicate a future demand for avocados during a particular week corresponding to the forecast time 502, at stores in a cooler climate. Thus, the system 100A, 100B or 200 can advantageously generate a highly granular forecast for a future value specifically tailored to a subset of data having common characteristics as identified by the system 100A, 100B or 200.

Figure 5B:
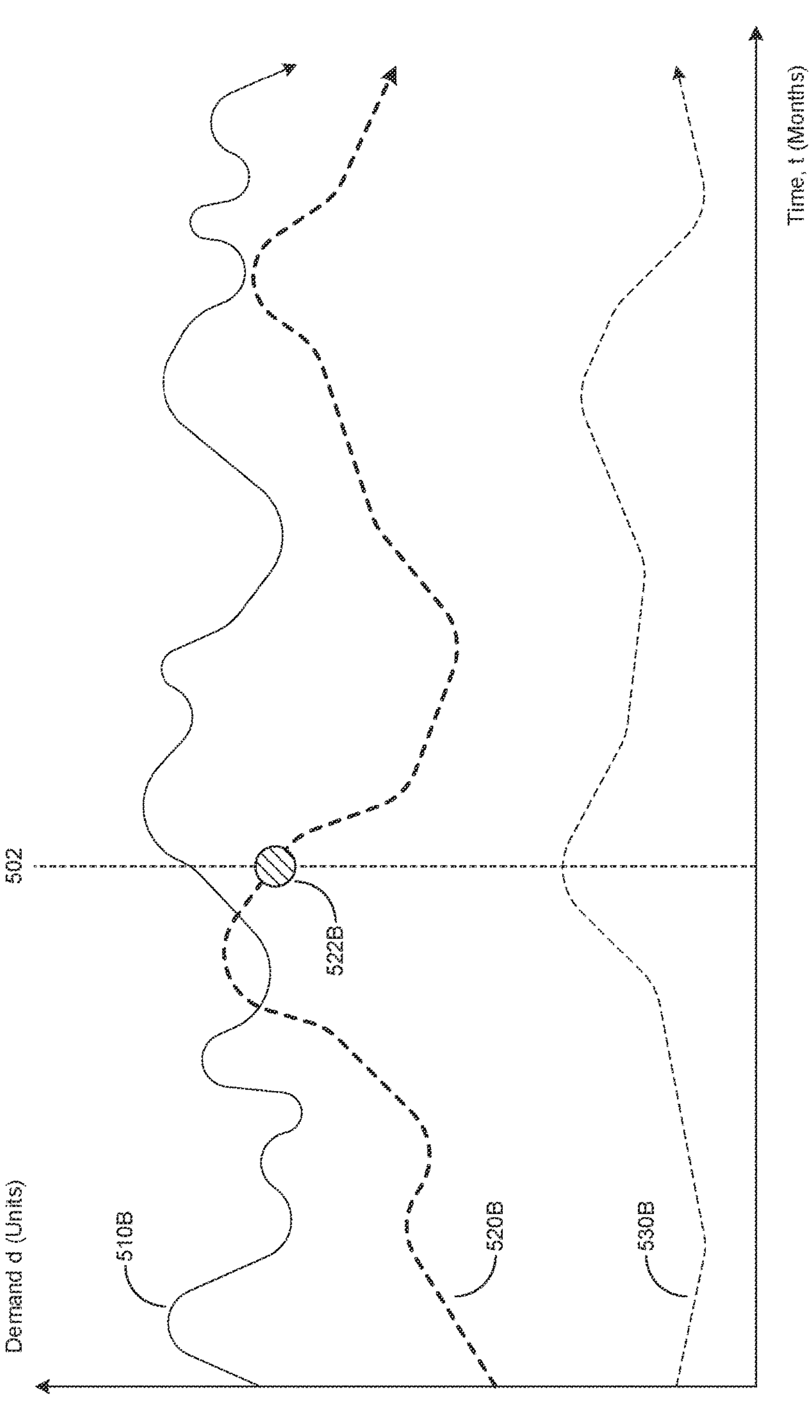
FIG. 5B illustrates a second state of a forecast model for a segmented data set, further to the model of FIG. 5A.

FIG. 5B illustrates a second state of a forecast model for a segmented data set, further to the model of FIG. 5A. As illustrated by way of example in FIG. 5A, an example model 500B can include a first deselected forecast curve 510B, a selected forecast curve 520B, a second deselected forecast curve 530B, and a selected forecast point 522B.

In response to a user request to generate a particular forecast, the system 100A, 100B or 200 can generate a forecast based on a forecast point correspond to a particular segment. The system 100A, 100B or 200 can select the forecast point by identifying a cluster having characteristics matching one or more characteristics of an input, can select a model optimized for the identified cluster, and can generate a forecast based on the selected model optimized for the identified cluster. Thus, the system 100A, 100B or 200 can advantageously generate a highly granular forecast.

As one example, the system 100A, 100B or 200 can receive a request to forecast demand for avocados at a particular store in a temperate climate. The system can identify the request as related to a store having characteristics corresponding to a store in a temperate climate, and can select a model corresponding to a temperate climate. Thus, the system 100A, 100B or 200 can select the selected forecast curve 520B and can deselect the first deselected forecast curve 510B and the second deselected forecast curve 530B, respectively associated with stores in warmer and cooler climates. Finally, the system can select the forecast point 522B at the requested forecast time 502, and can transmit at least the forecast value of the forecast point 522B to the user.

Figure 6:
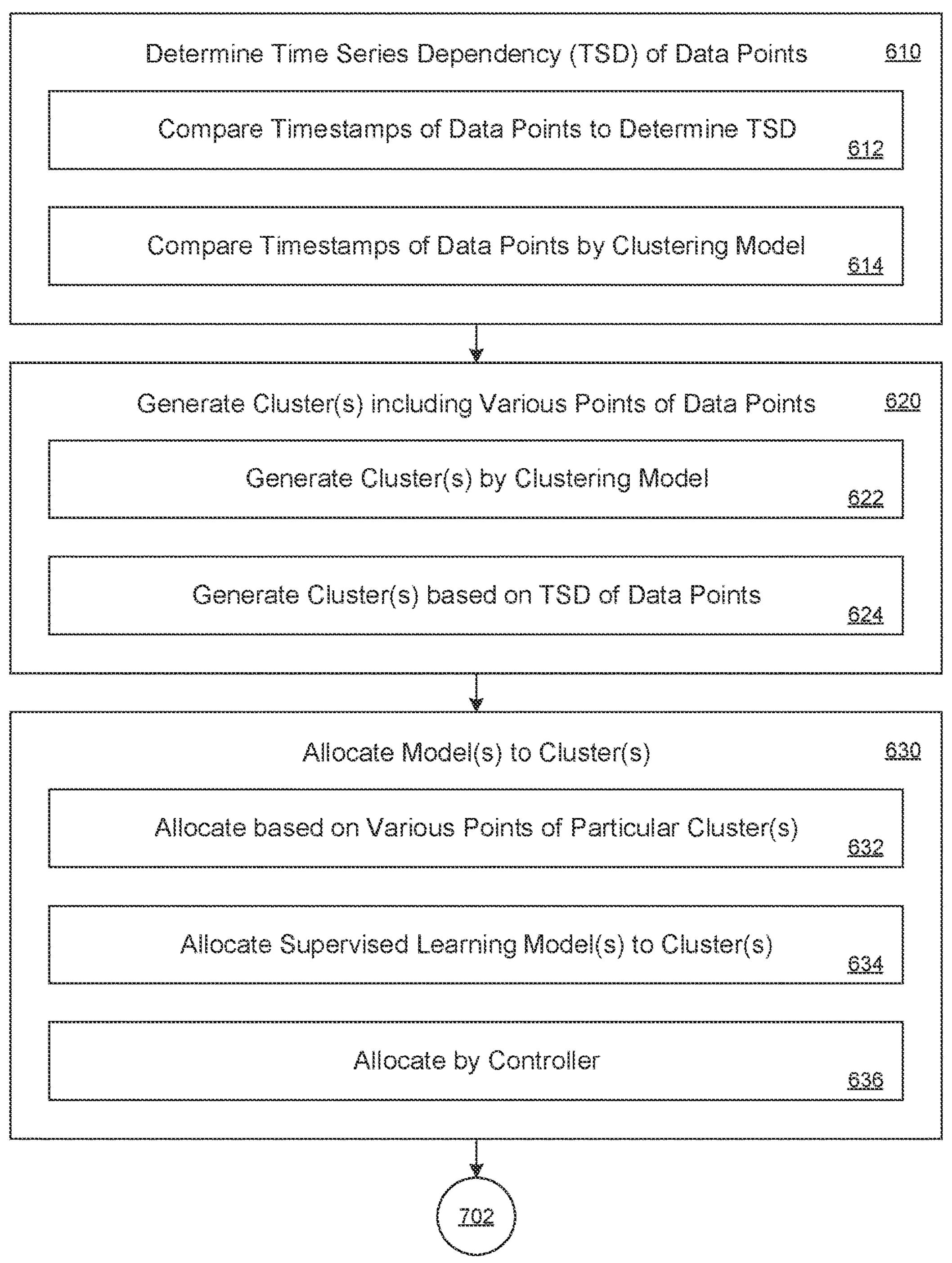
FIG. 6 illustrates a method of segmenting data and forecasting by a combination of models trained on segmented data in accordance with implementations.

FIG. 6 illustrates a method of segmenting data and forecasting by a combination of models trained on segmented data in accordance with present implementations. At least one of the systems 100A, 100B or 200 can perform method 600 according to present implementations. The method 600 can begin at step 610.

At step 610, the method can determine at least one time series dependency corresponding to one or more data points. Step 610 can include at least one of steps 612 or 614. At step 612, the method can compare timestamps of one or more data points to determine a time series dependency. At step 614, the method can compare timestamps of one or more data points by a clustering model. The clustering model can perform, but is not limited to, point-in-time clustering or dominant-over-time clustering. The method 600 can then continue to step 620.

At step 620, the method can generate one or more clusters including various points among the data points. The various points can include subsets of the data points. Step 620 can include at least one of steps 622 or 624. At step 622, the method can generate one or more clusters including the various data points by a clustering model. At step 624, the method can generate one or more clusters based on a time series dependency associated with one or more of the data points. The method 600 can then continue to step 630.

At step 630, the method can allocate one or more models to one or more corresponding clusters. Step 630 can include at least one of steps 632, 634 or 636. At step 632, the method can allocate one or more models based on various points associated with particular clusters. The method can allocate a model to each cluster, and can thus allocate data points associated with that particular cluster to that particular corresponding allocated model. At step 634, the method can allocate at least one supervised learning model to one or more of the clusters. The method can also allocate a particular supervised learning model optimized for the particular cluster to that cluster, as discussed herein with respect at least to the allocation controller 242. At step 636, the method can allocate the model or models by a controller. The controller can correspond to the allocation controller 242. The method 600 can then continue to step 702.

Figure 7:
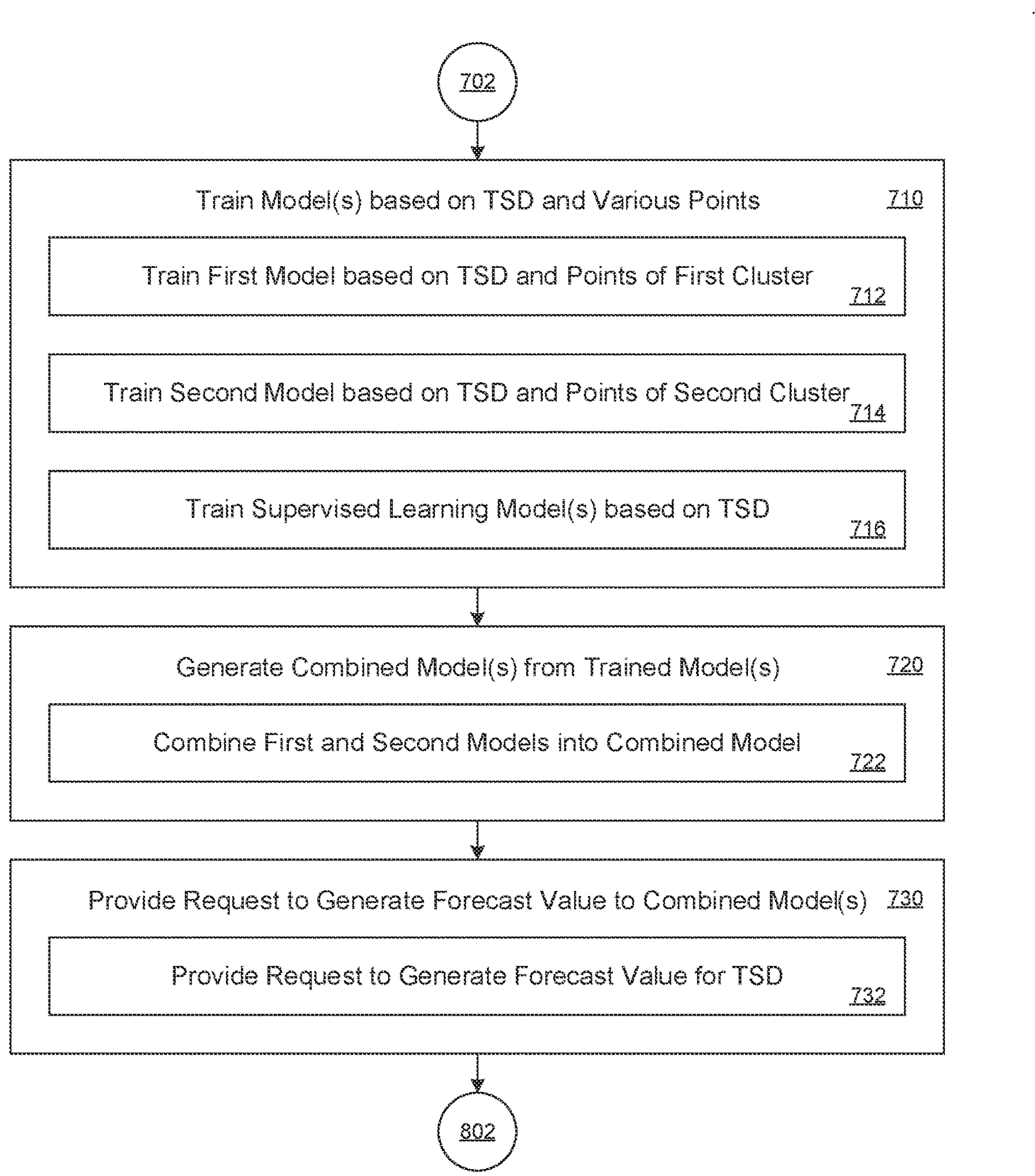
FIG. 7 illustrates a method of segmenting data and forecasting by a combination of models trained on segmented data further to the method of FIG. 6.

FIG. 7 illustrates a method of segmenting data and forecasting by a combination of models trained on segmented data further to the method of FIG. 6. At least one of the systems 100A, 100B or 200 can perform method 700 according to present implementations. The method 700 can begin at step 702. The method 700 can then continue to step 710.

At step 710, the method can train at least one model based on a time series dependency and one or more data points associated with the model. Step 710 can include at least one of steps 712, 714 or 716. At step 712, the method can train a first model based on the time series dependency and data points associated with a first cluster. At step 714, the method can train a second model based on the time series dependency and data points associated with a second cluster. At step 716, the method can train one or more supervised learning models based on the time series dependency. The method 700 can then continue to step 720.

At step 720, the method can generate at least one combined model including or based on, for example, the one or more trained models. Step 720 can include step 722. At step 722, the method can combine first and second models into a combined model. The combined model can include a decision or selection portion to select a particular model within or associated with the combined model. The method 700 can then continue to step 730.

At step 730, the method can provide at least one request to generate a forecast value. The method can provide the request to the combined model. As one example, the request controller 260 can provide the request. Step 730 can include step 732. At step 732, the method can provide a request to generate a forecast value based on a time series dependency. The method 700 can then continue to step 802.

Figure 8:
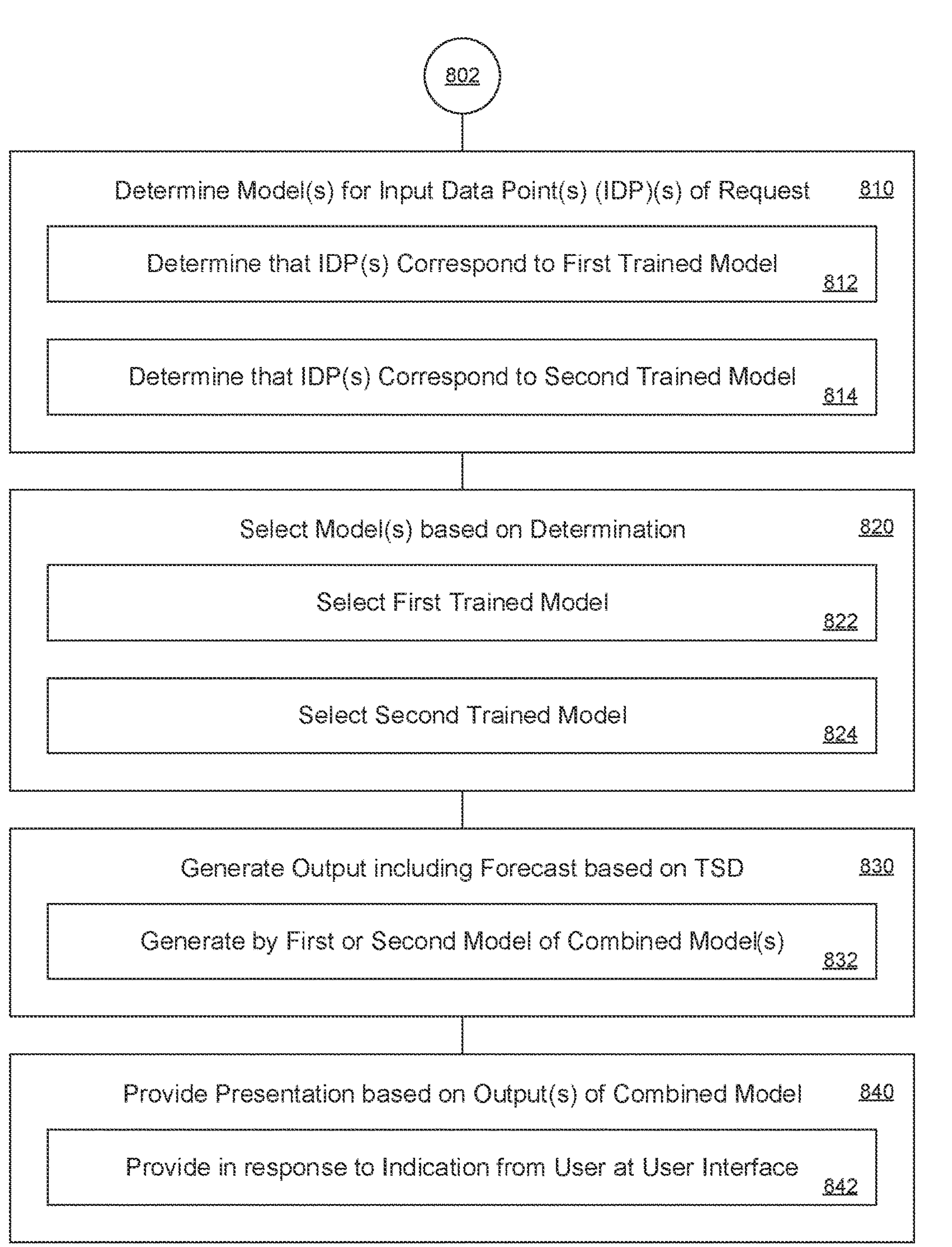
FIG. 8 illustrates a method of segmenting data and forecasting by a combination of models trained on segmented data further to the method of FIG. 7.

FIG. 8 illustrates a method of segmenting data and forecasting by a combination of models trained on segmented data further to the method of FIG. 7. At least one of the systems 100A, 100B or 200 can perform method 800 according to present implementations. The method 800 can begin at step 802. The method 800 can then continue to step 810.

At step 810, the method can determine one or more models corresponding to one or more input data points associated with a request. As one example, input data points associated with a request can include historical sales data for avocados at a particular store. Step 810 can include at least one of steps 812 or 814. At step 812, the method can determine that one or more input data points correspond to a first trained model. At step 814, the method can determine that one or more input data points correspond to a second trained model. The method 800 can then continue to step 820.

At step 820, the method can select at least one model based on the determination. Step 820 can include at least one of steps 822 or 824. At step 822, the method can select a first trained model. At step 824, the method can select a second trained model. The method 800 can then continue to step 830.

At step 830, the method can generate output including a forecast based on a time series dependency. Step 830 can include step 832. At step 832, the method can generate the output by a first model or a second model of a combined model. The method 800 can then continue to step 840.

At step 840, the method can provide a presentation based on output of the combined model. As one example, output can correspond to a forecast value, and can correspond at least partially to one or more of FIGS. 3A-B, 4 and 5A-B. Step 840 can include step 842. At step 842, the method can provide a presentation in response to an indication from a user at a user interface. Present implementations can advantageously provide an output to a user optimized by a particular trained model, based on a request to the combined model overall. Thus, the user can advantageously receive optimized output without manually selecting or specifying an optimized trained model particular to the input data set associated with the request. As one example, the user does not need to know the climate of the store for which an avocado sales forecast for that store is requested. The method 800 can end at step 840.

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

The foregoing description of illustrative implementations has been presented for purposes of illustration and of description. It is not intended to be exhaustive or limiting with respect to the precise form disclosed, and modifications and variations are possible in light of the above teachings or may be acquired from practice of the disclosed implementations. It is intended that the scope of the invention be defined by the claims appended hereto and their equivalents.

What is claimed is:

1. A system, comprising:

a data processing system comprising memory and one or more processors configured to perform operations including:

clustering, with a first model, a plurality of time series data sets represented by a plurality of data points, wherein each data point of the plurality of data points includes a set of one or more feature values characterizing a respective time series data set of the plurality of time series data sets, wherein the clustering is based on the sets of one or more feature values, and wherein the clustering produces at least a first cluster and a second cluster, the first cluster including one or more first time series data sets of the plurality of time series data sets represented by one or more first data points of the plurality of data points, the second cluster including one or more second time series data sets of the plurality of time series data sets represented by one or more second data points of the plurality of data points;

allocating a second model to the first cluster of one or more first time series data sets and a third model to the second cluster of one or more second time series data sets;

training the second model based on the one or more first time series data sets corresponding to the one or more first data points, and training the third model based on the one or more second time series data sets corresponding to the one or more second data points;

generating a fourth model based on a combination of the second trained model and the third trained model;

providing, to the fourth model, a request to generate a forecast value based on one or more time series data points; and generating, based on input to at least one of the second model or the third model including one or more of the time series data points, an output including a forecast based on the time series data points.

2. The system of claim 1, wherein the first model comprises a clustering model, and wherein the operations further include providing, in response to user input, a presentation based on the fourth model, the first data points, and the second data points.

3. The system of claim 1, wherein the second model comprises a first supervised model and the third model comprises a second supervised model.

4. The system of claim 3, wherein the first supervised model is configured to generate an output based on one or more characteristics of the first cluster.

5. The system of claim 4, wherein the second supervised model is configured to generate an output based on one or more characteristics of the second cluster.

6. The system of claim 1, wherein the operations further include:

determining, based on one or more of the time series data points, that the time series data points correspond to the second model;

selecting the second model based on the determination that the time series data points correspond to the second model; and generating, based on input to the second model including one or more of the time series data points, the output including the forecast based on the time series data points.

7. The system of claim 1, wherein the operations further include:

determining, based on one or more of the time series data points, that the time series data points correspond to the third model;

selecting the third model based on the determination that the time series data points correspond to the third model; and generating, based on input to the third model including one or more of the time series data points, the output including the forecast based on the time series data points.

8. The system of claim 1, wherein the time series data points correspond to a series having one or more values corresponding to at least one of the first cluster or the second cluster.

9. A method, comprising:

clustering, by a data processing system and with a first model, a plurality of time series data sets represented by a plurality of data points, wherein each data point of the plurality of data points includes a set of one or more feature values characterizing a respective time series data set of the plurality of time series data sets, wherein the clustering is based on the sets of one or more feature values, and wherein the clustering produces at least a first cluster and a second cluster, the first cluster including one or more first time series data sets of the plurality of time series data sets represented by one or more first data points of the plurality of data points, the second cluster including one or more second time series data sets of the plurality of time series data sets represented by one or more second data points of the plurality of data points;

allocating, by the data processing system, a second model to the first cluster of one or more first time series data sets and a third model to the second cluster of one or more second time series data sets;

training, by the data processing system, the second model based on the one or more first time series data sets corresponding to the one or more first data points, and training the third model based on the one or more second time series data sets correspond to the one or more second data points;

generating, by the data processing system, a fourth model based on a combination of the second trained model and the third trained model;

providing, by the data processing system to the fourth model, a request to generate a forecast value based on one or more time series data points; and generating, by the data processing system based on input to at least one of the second model or the third model including one or more of the time series data points, an output including a forecast based on the time series data points.

10. The method of claim 9, further comprising providing, by the data processing system in response to receiving an indication from a user by a user interface, a presentation based on the fourth model, the first data points, and the second data points, wherein the first model comprises a clustering model.

11. The method of claim 9, wherein the second model comprises a first supervised model and the third model comprises a second supervised model.

12. The method of claim 11, wherein the first supervised model is configured to generate an output based on one or more characteristics of the first cluster.

13. The method of claim 12, wherein the second supervised model is configured to generate an output based on one or more characteristics of the second cluster.

14. The method of claim 9, further comprising:

determining, by the data processing system based on one or more of the time series data points, that the time series data points correspond to the second model;

selecting, by the data processing system, the second model based on the determination that the time series data points correspond to the second model; and generating, by the data processing system, based on input to the second model including one or more of the time series data points, the output including the forecast based on the time series data points.

15. The method of claim 9, further comprising:

determining, by the data processing system based on one or more of the time series data points, that the time series data points correspond to the third model;

selecting, by the data processing system, the third model based on the determination that the time series data points correspond to the third model; and generating, by the data processing system, based on input to the third model including one or more of the time series data points, the output including the forecast based on the time series data points.

16. The method of claim 9, wherein the time series data points correspond to a series having one or more values corresponding to at least one of the first cluster or the second cluster.

17. A non-transitory computer readable medium including one or more instructions stored thereon and executable by a processor to perform operations including:

clustering, with a first model, a plurality of time series data sets represented by a plurality of data points, wherein each data point of the plurality of data points includes a set of one or more feature values characterizing a respective time series data set of the plurality of time series data sets, wherein the clustering is based on the sets of one or more feature values, and wherein the clustering produces at least a first cluster and a second cluster, the first cluster including one or more first time series data sets of the plurality of time series data sets represented by one or more first data points of the plurality of data points, the second cluster including one or more second time series data sets of the plurality of time series data sets represented by one or more second data points of the plurality of data points;

allocating a second model to the first cluster of one or more first time series data sets and a third model to the second cluster of one or more second time series data sets;

training the second model based on the one or more first time series data sets corresponding to the one or more first data points, and training the third model based on the one or more second time series data sets correspond to the one or more second data points;

generating a fourth model based on a combination of the second trained model and the third trained model;

providing, to the fourth model, a request to generate a forecast value based on one or more time series data points; and generating, based on input to at least one of the second model or the third model including one or more of the time series data points, an output including a forecast based on the time series data points.

* * * * *